United States Patent [19]

Strand

[11] Patent Number: 4,571,129
[45] Date of Patent: Feb. 18, 1986

[54] MANDREL ASSEMBLY

[75] Inventor: Kevin O. Strand, Garfield Heights, Ohio

[73] Assignee: Erickson Tool Company, Solon, Ohio

[21] Appl. No.: 670,947

[22] Filed: Nov. 13, 1984

[51] Int. Cl.⁴ .............................................. B23B 41/10
[52] U.S. Cl. ...................................... 408/54; 279/2 A; 384/100; 384/439; 384/556; 408/80; 408/708
[58] Field of Search ...................... 279/2 A, 4; 408/79, 408/80, 81, 238, 705, 708, 82, 83, 54, 72, 1 R; 82/1.2, 4 R, 4 C; 384/100, 267, 439, 556; 409/231, 232

[56] References Cited

U.S. PATENT DOCUMENTS

| | | | |
|---|---|---|---|
| 1,592,166 | 7/1926 | Turner | 408/82 |
| 1,729,862 | 10/1929 | Becker | 408/82 |
| 1,806,891 | 5/1931 | Chadwick | 408/82 |
| 1,963,803 | 6/1934 | Petzinger | 408/82 |
| 2,020,439 | 12/1935 | Sorensen | 408/227 |
| 2,065,486 | 12/1936 | Albertson | 408/82 |
| 2,334,795 | 11/1943 | Smith | 408/83 |
| 3,348,434 | 10/1967 | Plummer | 408/705 |
| 3,674,375 | 7/1972 | Reed | 408/103 |
| 3,977,805 | 8/1976 | Wanous | 408/115 B |
| 4,365,917 | 12/1982 | Harmand | 409/201 |

Primary Examiner—Gil Weidenfeld
Assistant Examiner—Daniel W. Howell
Attorney, Agent, or Firm—Pearne, Gordon, Sessions, McCoy, Granger & Tilberry

[57] ABSTRACT

An apparatus and method is provided for an air bearing support of a rotatable tooling bar, such as a boring bar. One or two mandrels may be provided for this tooling bar to form a complete mandrel assembly with the tooling bar. An air pressure expansible collet is provided on each mandrel so that each may be clamped within a clamping aperture, such as an aperture on the workpiece itself. Air under pressure is supplied to the two mandrels simultaneously to accomplish, first, an air bearing centering of each mandrel around the tooling bar as a guide; second, an expansion of the collet on each mandrel for clamping of each mandrel within the clamping apertures; and, third, provision of an air bearing support and centering of the tooling bar within the two mandrels during machining for precise machining of the workpiece by the continued air supply. The foregoing abstract is merely a resume of one general application, is not a complete discussion of all principles of operation or applications, and is not to be construed as a limitation on the scope of the claimed subject matter.

24 Claims, 7 Drawing Figures

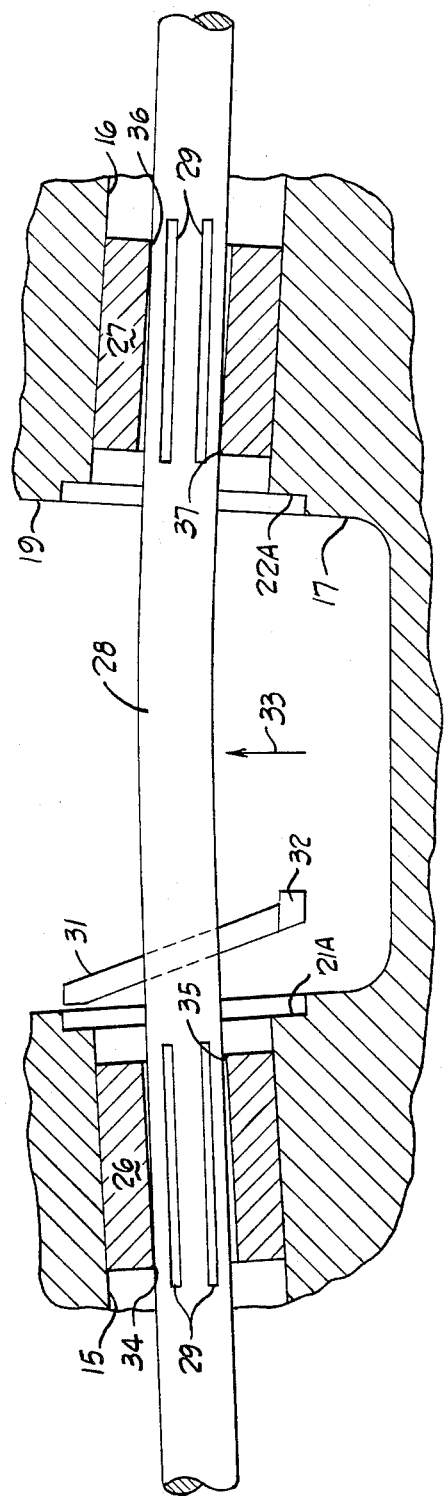
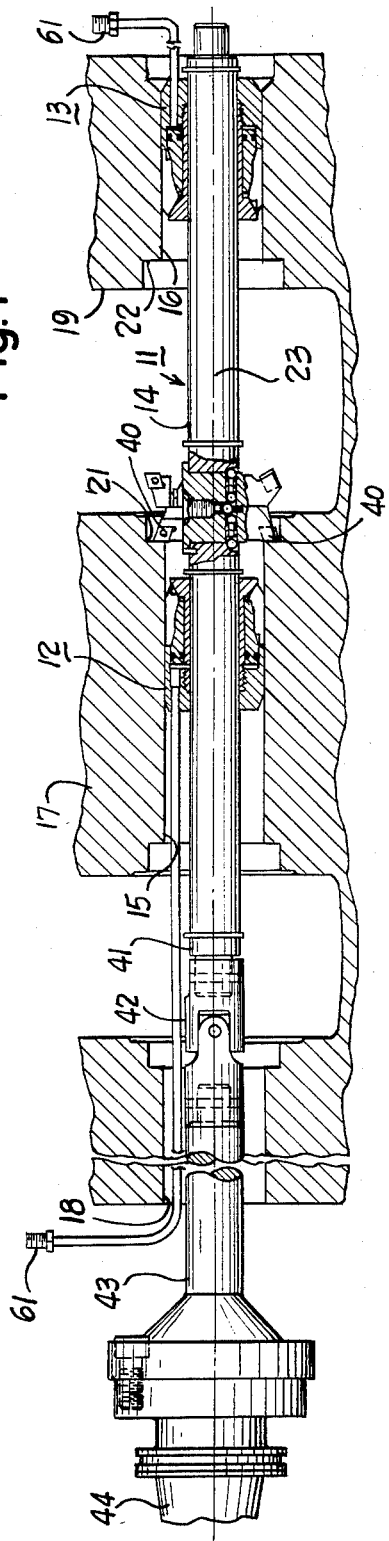
Fig. 1 PRIOR ART
Fig. 2

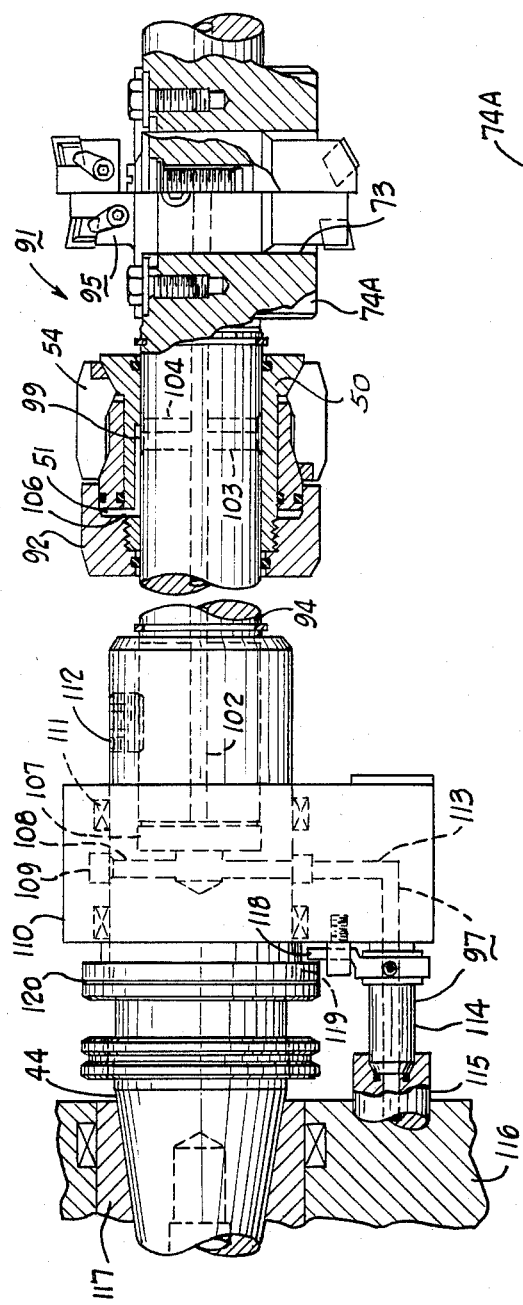
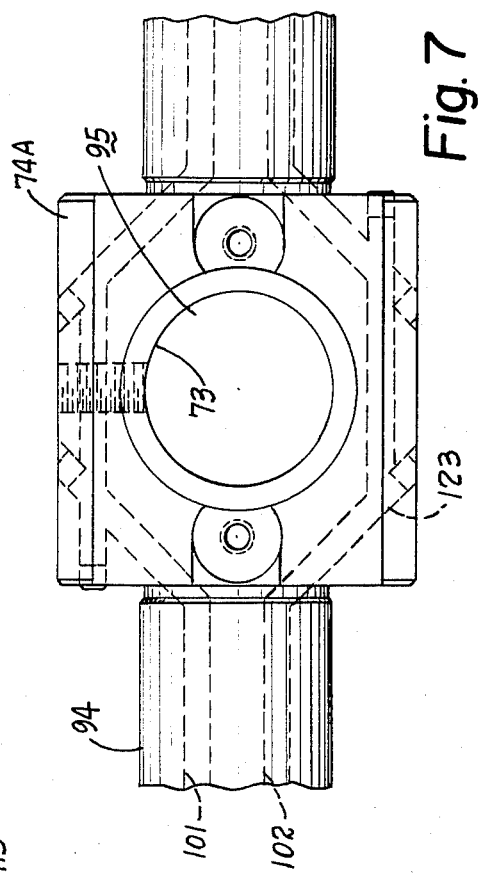

MANDREL ASSEMBLY

BACKGROUND OF THE INVENTION

The prior art has previously suggested the use of an expanding collet secured within an aperture of a workpiece or machine tool for guiding a movable tool. U.S. Pat. No. 1,592,166, inventor, W. H. Turner, and issued July 13, 1926, shows an expanding collet-type bushing for a reamer. U.S. Pat. Nos. 1,729,862; 1,806,891; and 1,963,803 further show expanding bushings or pilots for cutting tools.

U.S. Pat. Nos. 2,020,439 and 3,674,375 disclose the concept of guiding a boring bar at two axially separated places, with the boring tool between. This patent, as well as U.S. Pat. Nos. 2,065,486 and 3,977,805, also discloses the concept of utilizing a type of universal joint so that the axis of the boring tool and the axis of the drive therefor need not be in exact alignment.

Where deep holes are being bored or otherwise machined, it has previously been suggested to utilize four wear strips on a boring tool guide bushing, and this has been disclosed in U.S. Pat. Nos. 2,334,795 and 3,348,434.

U.S. Pat. No. 4,365,917 permits angular adjustment and clamping of a spherical guide bushing by means of air pressure.

In the boring of a deep hole in a workpiece and subsequent machining of an annular surface on that workpiece which is in a plane perpendicular to the boring tool axis of rotation, there is a problem in getting such annular surface perpendicular or normal to such axis during the subsequent machining step. This is part of the general problem of precision machining of surfaces of revolution relative to an axis, whether such surfaces are annular, cylindrical, or conical. As an example, the preferred embodiments emphasize annular surfaces.

The problem is greatly compounded when the boring of the workpiece is attempted through two separate axially separated portions of the workpiece to form two axially separated workpiece apertures. This necessarily means that the workpiece is long and the boring bar is long, and hence may flex or otherwise bore two apertures which are not exactly coaxial. Then with the subsequent machining of the annular surfaces, one each supposedly normal to the axis of the adjacent aperture, these two annular surfaces have been found to be not in parallel planes. An example of where parallel planes are desired on two spaced portions of a workpiece is in the machining of bores in a large valve to achieve two fluid flow apertures and then the machining of two annular surfaces to receive valve seats, with the valve seats supposedly parallel to receive a perpendicularly moving gate valve which is to be received in close and fluidtight communication with the valve seats. If the two valve seats are not parallel, then there will be leakage in the gate valve. The prior art attempts to machine such two annular surfaces necessitated careful boring of the two workpiece apertures and careful reaming or other machining to try to obtain these two apertures coaxial within a minimum tolerance, and hence they were both precision bores.

Next, annular surfaces on the two spaced portions of the workpiece were machined, each normal to the adjacent aperture axis, and hence it was presumed that these two annular machined surfaces were parallel. In a large valve body which might be four or five feet long, this machining could take days to complete.

SUMMARY OF THE INVENTION

The problem to be solved, therefore, is how to precision machine an annular surface on a workpiece which is normal to the axis of an aperture in the workpiece, and to accomplish this quickly enough to radically lower the cost of manufacture. More specifically, the problem to be solved is how to machine two axially spaced annular surfaces on a workpiece, with each annular surface adjacent axially spaced apertures in the workpiece, and to have these two annular surfaces lie in parallel planes.

This problem is solved by a mandrel assembly for clamping on the inner surface of a clamping aperture to journal a rotatable tooling bar comprising, in combination, an elongated rotatable tooling bar of a diameter smaller than the clamping aperture and adapted to have a cutting tool rotatable therewith, a mandrel in said mandrel assembly and having a body, an air pressure expansible chamber in said mandrel body, an expanding collet carried on said mandrel body, force transfer means connected between said expansible chamber and said collet, an annular journal surface rotatable with said tooling bar, an annular bearing surface on said mandrel body in close proximity to said annular journal surface, and means connected to said mandrel body adapted to supply air under pressure to the annular space between said annular journal and bearing surfaces to establish an air bearing of said tooling bar in said mandrel body, and to supply air into said expansible chamber to expand said expanding collet against the inner surface of the clamping aperture to clamp the mandrel within the clamping aperture.

The problem is further solved by a mandrel assembly for clamping on the inner surface of a clamping aperture to journal a rotatable tooling bar adapted to have a cutting tool rotatable therewith, the mandrel assembly including a mandrel having an expansible collet on a mandrel body with an annular journal surface rotatable with the tooling bar closely cooperable with an annular bearing surface on the mandrel body, characterized by an air pressure expansible chamber in said mandrel body, force transfer means between said expansible chamber and said expansible collet, means for supplying air under pressure to the annular space between said annular journal and bearing surfaces to establish an air bearing of the tooling bar in said mandrel, and means for supplying air under pressure into said expansible chamber to expand the expanding collet against the inner surface of the clamping aperture to clamp the mandrel within the clamping aperture.

The problem is further solved by the method of clamping a mandrel assmebly into a clamping aperture to journal a rotatable tooling bar adapted to have a cutting tool rotatable therewith, the mandrel assembly including a mandrel having an expansible collet on a mandrel body with an annular journal surface rotatable with the tooling bar closely cooperable with an annular bearing surface on the mandrel body, said method comprising the steps of providing an air pressure expansible chamber in the mandrel body, providing force transfer means between the expansible chamber and the expansible collet, supplying air under pressure to the annular space between the annular journal and bearing surfaces to establish an air bearing centering the mandrel around the tooling bar, and supplying air under pressure into said expansible chamber to expand the expanding collet against the inner surface of the clamping aperture to clamp the mandrel within the clamping aperture.

Accordingly, an object of the invention is to provide a precision machining apparatus and method.

Another object of the invention is to provide a mandrel assembly of a mandrel and a tooling bar wherein the mandrel is first centered around the tooling bar and then clamped in position in a clamping aperture.

Another object of the invention is to provide a dual use of air pressure for actuating an expanding mandrel and also providing an air bearing of a rotatable tooling bar.

A still further object of the invention is to provide a triple use of air pressure, to center a mandrel around a tooling bar, to expand a collet in the mandrel to clamp in a clamping aperture, and to provide an air bearing support of a rotating tooling bar during machining.

Other objects and a fuller understanding of the invention may be had by referring to the following description and claims, taken in conjunction with the accompanying drawing.

BRIEF DESCRIPTION OF THE DRAWING

FIG. 1 is a longitudinal, sectional view of the prior art;

FIG. 2 is a longitudinal, sectional view of the mandrel assembly of the present invention;

FIG. 6 is a longitudinal, sectional view of part of a modified mandrel assembly; and FIG. 7 is an enlarged, partial plan view of the modified mandrel assembly of FIG. 6.

DESCRIPTION OF THE PREFERRED EMBODIMENTS

Figure 3:
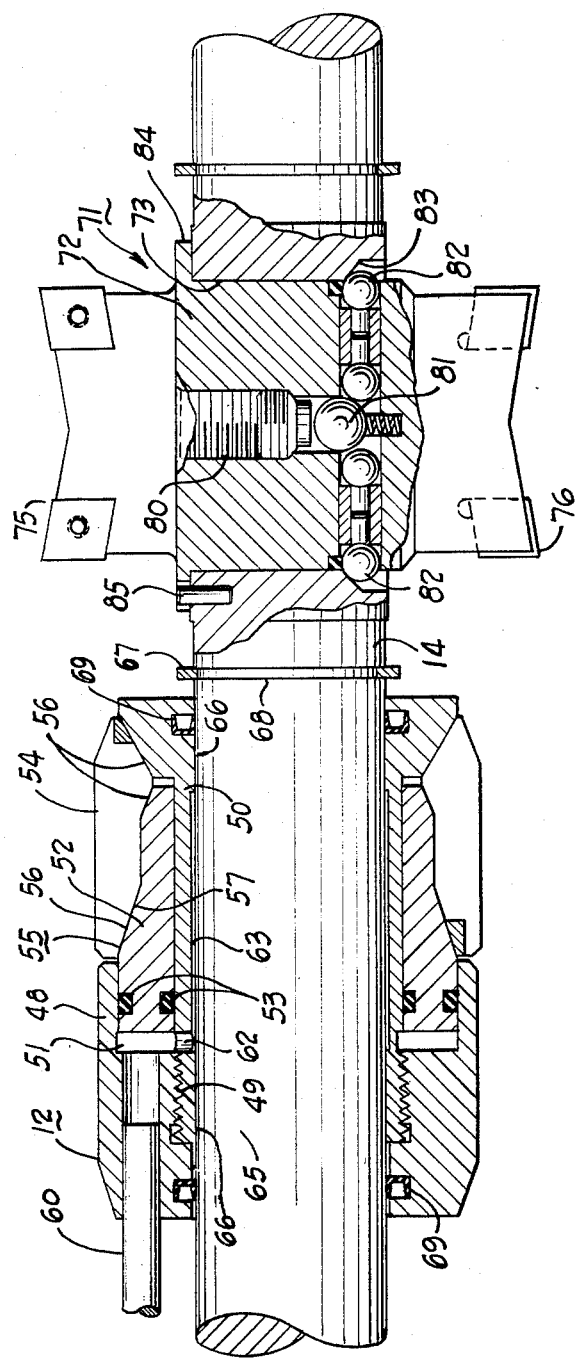
FIG. 3 is an enlarged, partial longitudinal view of the invention.
Figure 4:
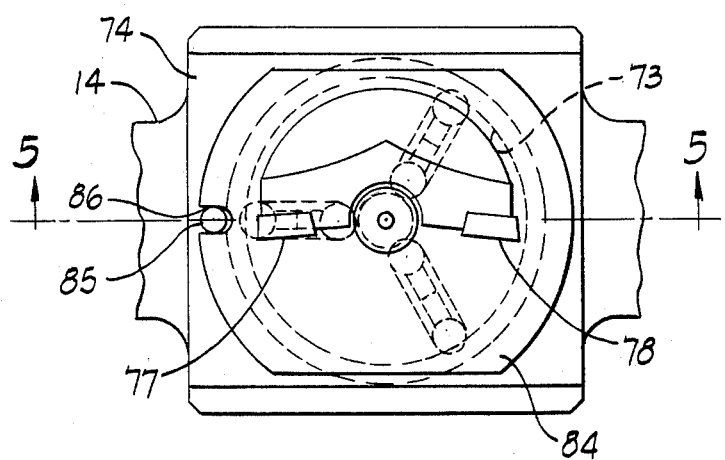
FIG. 4 is a plan view of the tooling assembly.

FIGS. 2 to 5 show a mandrel assembly 11, which includes generally first and second mandrel bodies 12 and 13, respectively, and a tooling bar 14. The mandrel assembly 11 is adapted to be clamped on the inner surface of first and second clamping apertures 15 and 16, respectively. These clamping apertures may be part of the machine tool, or a fixture, but in this embodiment are a part of a long workpiece 17 which additionally has a third aperture 18 through which the tooling bar 14 extends. This workpiece 17 is an example of one which is difficult to machine with accuracy because of its length, which might be four or five feet long, and because of limited access through a transverse aperture 19. In this workpiece 17, the apertures 15, 16, and 18 have previously been bored by a boring tool on a long boring bar. Because of the considerable length-to-diameter ratio of that long, slender boring bar, the three apertures 15, 16, and 18 have often been found to be not exactly coaxial. In other words, the boring bar may bend slightly during machining of these three apertures 15, 16, and 18. Alternatively, if bored from opposite ends, the three apertures could be misaligned. The prior art practice was to ream these bored holes to a more precise diameter; however, the reamer also was necessarily long relative to its diameter, and hence slightly flexible, so that generally if the apertures were not coaxial when bored, they were still not coaxial after reaming.

An example of a difficult-to-machine workpiece is a large valve body which might have multiple gate valves along it, such as would extend transversely through the transverse aperture 19. An annular surface 21 on the workpiece 17 adjacent the aperture 15 and an annular surface 22 adjacent the aperture 16 were desired to be machined by the mandrel assembly 11. These two annular surfaces would eventually accept valve seats parallel to these annular surfaces 21 and 22, and then a gate valve would be movable through the transverse aperture 19 perpendicular to the axis of the surfaces 21 and 22 in order to close or open this gate valve. In order to be assured that the gate valve would not leak fluid, which fluid eventually would be passing through the apertures 15, 16, and 18, it was imperative that the valve seats be precisely positioned, which meant that the two machined annular surfaces 21 and 22 should be parallel.

Referring now to the prior art shown in FIG. 1, a portion of the workpiece 17 is illustrated, to an enlarged scale relative to that shown in FIG. 2. This workpiece in FIG. 1 shows the clamping apertures 15 and 16 which have been previously bored, and this figure illustrates, to a slightly exaggerated scale, that these two aperatures are not coaxial because of the bending of the elongated boring bar which had previously bored these apertures. Guide bushings 26 and 27 were machined to have a close fit inside the apertures 15 and 16. A tooling bar 28 was guided by these guide bushings 26 and 27 and had wear strips 29, usually four in number, mounted in keyway-type slots in the tooling bar 28. The guide bushings and the wear strips could all be made from bronze, for example, and the wear strips could be replaced as they wore. A tool 31 rotated by the tooling bar 28 could be used to machine the annular surface 21A, and a tool 32, also rotated by the tooling bar 28, could be used to machine the annular surface 22A. In the latter case, this would be with the tooling bar 28 longitudinally moved to engage that portion of the workpiece 17 adjacent the aperture 16.

The wear strips were machined to have a close fit inside the guide bushings 26 and 27; hence, this meant that the tooling bar 28 would be bowed in the direction of the arrow 33 because the two apertures 15 and 16 were not coaxial. Also, this meant that there would be excessive wear on the guide bushings 15 at points 34 and 35, and also excessive wear on the wear strips 29 at corresponding locations; and that, similarly, there would be excessive wear on the guide bushing 27 at points 36 and 37 and wear on the wear strips 29 adjacent guide bushing 27 at corresponding locations. Even though the apertures 15 and 16 had been bored and then subsequently reamed to try to make them coaxial, it was found that in many cases they were not coaxial; hence, the machined surfaces 21A and 22A were not parallel with each other. Then when valve seats were mounted in these machined annular surfaces 21A and 22A and a gate valve moved in the transverse aperture 19, to and fro along the direction of the arrow 33, it did not have a good sealing engagement with the valve seats, and would leak. Also, as the wear strips and guide bushings would wear, the tooling bar 28 would chatter in these guide bushings to provide a distorted machined annular surface 21A and 22A.

The present invention overcomes the deficiencies of the prior art apparatus and method of machining. The present apparatus and method is illustrated in FIGS. 2–5, wherein the tooling bar 14 may be many different forms of bars capable of performing machining, including drills, reamers, and milling cutters, and has been shown as a boring bar carrying two diametrically opposed cutting tools 40 to machine the annular surface 21. Such tools can make a cut for the annular surface 21 by the axial and rotational movement of the tooling bar 14.

The tooling bar 14 may be driven by a machine spindle (not shown) having a drive end 41 connected through a universal joint 42 to a drive shaft 43, which may be connected by a conical driver 44 to a drive spindle (not shown). The purpose of the universal joint 42 is to provide rotation of the tooling bar 14 despite slight misalignments of the apertures 15, 16, and 18, so as to not place any lateral thrust or bending moment on such tooling bar 14.

The two mandrels 12 and 13 may be identical, although reversed end-for-end in position, and hence only the mandrel 12 will be described in detail with reference to FIG. 3. The mandrel 12 includes an annular mandrel body 48 which is threaded at 49 to receive a bearing sleeve 50, which may be bronze, for example. The inner end of the mandrel body 48, together with the bearing sleeve 50, form an annular cylinder 51 into which an annular piston 52 is closely received. These form an air-expansible chamber in the body 48. O-rings 53 establish an axially sliding seal of the piston within the cylinder.

An annular expandable collet 54 surrounds and is carried by the mandrel body 48, the bearing sleeve 50, and the piston 52. Force transfer means 55 is connected between the piston 52 and the expandable collet. This force transfer means transfers the axial movement of the piston 52 into generally a radial movement of the collet 54. This force transfer means 55 includes cam surfaces 56 on the piston 52 and on the bearing sleeve 50, and includes cam follower surfaces 57 on the inner periphery of the collet 54.

Means is provided to supply air pressure to said annular cylinder 51 and this includes an air supply conduit 60 soldered or otherwise secured in the mandrel body 48 and having a quick-disconnect coupling 61, as shown in FIG. 2. Radial apertures 62, preferably three in number and equally spaced, lead from the annular cylinder 51 to a small reservoir 63 formed by a relieved portion in the bearing sleeve 50. An annular journal surface 65 is rotatable with the tooling bar 14 and in this preferred embodiment is a part of the surface of this tooling bar. This annular journal surface is in close proximity to an annular bearing surface 66 on the mandrel 12. In this preferred embodiment, the bearing surface 66 is all on the inner surface of the bearing sleeve 50. The axial lengths of the bearing surfaces 66 at each end of the mandrel 12 are approximately equal, at each end of the reservoir 63, in order to establish equal radial forces as an air bearing by air pressure leading from the cylinder 51 and from the reservoir 63. Preferably, the annular bearing and journal surfaces have a smooth finish, in the order of 30–40 microinch surface finish, and the radial clearance is in the order of 0.0005 inch. With such conditions, a 2-inch diameter tooling bar and with bearing surfaces 66 which are 1¼ inches long, the air bearing is capable of supporting 600–700 pounds of lateral force. C-clips 67 fit in grooves 68 in the tooling bar 14 to retain the mandrel 12 on the tooling bar 14, and wiper seals 69 keep dirt and other contaminants out of the air bearing.

Figure 5:
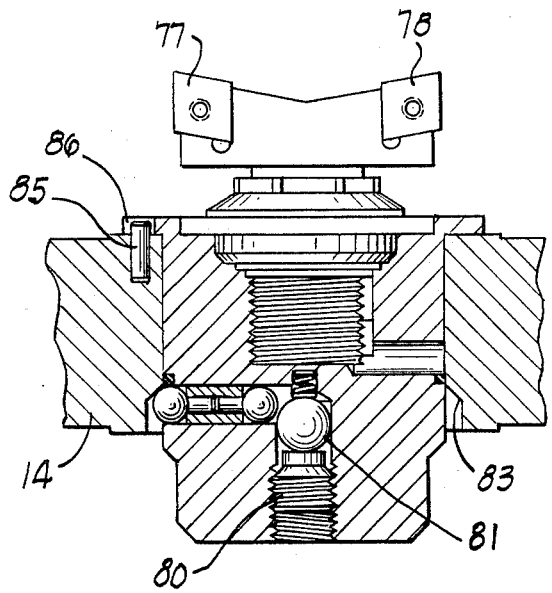
FIG. 5 is a longitudinal, sectional view on line 5—5 of FIG. 4.

A cutter assembly 71 is mountable on the tooling bar 14. This cutter assembly includes a cutter body 72 which is closely received within a transverse aperture 73 in an enlarged portion 74 of the tooling bar 14. This cutter body 72 mounts cutting tools, such as cutting inserts 75 and 76, for concurrent machining of the annular surface 21 at two diametrically opposed locations. Alternatively, as shown in FIG. 5, the cutting body may mount a cutting insert 77 for only single-point cutting of the annular surface 21, and may also mount a cutting insert 78 for single-point cutting of the second annular surface 22, when the tooling bar 14 is fed to the right, as viewed in FIGS. 2–5. The cutting body 72 may be mounted in the transverse aperture in any suitable manner, and in the preferred embodiment, a screw 80 acts through a central ball 81 and a plurality of radially arranged balls 82 to lock behind a chamfered shoulder 83 on the enlarged portion 74. The cutter body 72 has a flange 84 to engage the enlarged portion 74 and limit the transverse insertion of the cutter body. A locater pin 85 in the enlarged portion 74 engages a notch 86 in the flange 84 to prevent rotation of the cutter body under tool loading.

FIG. 3 illustrates the locking screw 80 being inserted from the flange end of the cutter body 72 and FIG. 5 illustrates a modification with the screw 80 being inserted from the opposite end. The cutting inserts may be arranged to be adjusted radially, as in FIG. 5, or may be fixedly mounted on the cutting body 72, and different diameters of cutting tools may be utilized for rough and finish cuts, as in the embodiment of FIGS. 3 and 4.

OPERATION

The workpiece 17 in this preferred embodiment provides clamping apertures 15 and 16, as well as the additional aperture 18, all three of which have been previously bored by a boring bar. Since such workpiece is quite long, the boring bar will be long and slender and may deviate slightly so that the apertures 15 and 16 are not quite coaxial. In this invention, they may remain non-precision bores which have not been reamed or otherwise precisely finished, and may be one or two degrees separated from being coaxial, or may have a diameter tolerance of as much as 1/32 inch one with respect to the other and also from one workpiece to another. The mandrel 12 is adapted to be clamped in the clamping aperture 15 and the mandrel 13 is adapted to be clamped in the clamping aperture 16.

The expandable collets 54 will be in their nonexpanded condition to permit axial insertion of the tooling bar 14 through the aperture 18 into the apertures 15 and 16. The C-clips 67 will retain the mandrels 12 and 13 in their approximate position. The operator may push or pull on the air supply conduits 60 in order to get the mandrels 12 and 13 into their proper axial position. The air supply conduits are connected to a common air supply at the quick-disconnect couplings 61. The cutter assembly 71 will be mounted in the transverse aperture 73 by access to the tooling bar 14 through the transverse workpiece aperture 19. Air under pressure is then supplied simultaneously through the two conduits 60 to the two annular cylinders, one at each mandrel 12 and 13. The initial flow of air will follow the paths of least resistance to pressurize the reservoirs 63 and have the air escape through the small radial clearance between the annular journal and bearing surfaces 65 and 66. This establishes an air bearing, which in this case is a radial bearing and centers the mandrels 12 and 13 around the tooling bar 14 just prior to or at the same time as the clamping of each mandrel is effected by the expandable collets 54. Such clamping is caused by the axial movement of the annular pistons 52, which act through the cam and cam follower to expand the annular collet 54. Preferably, the outer peripheral surface of the collet 54 is slightly convex or rounded, as by chamfering at the two ends thereof, so that this clamping will be effected on the inner periphery of the clamping apertures 15 and 16, despite slight misalignments of these two clamping apertures 15 and 16. Thus, the two mandrels 12 and 13 are self-aligning, as determined by the tooling bar 14 itself as a reference, and despite the two clamping apertures 15 and 16 not being coaxial. By so doing, the first annular surface 21 machined by the tools 75 and 76 and the second annular surface 22 as machined by a tool such as tool 78, will be parallel to each other within a much closer tolerance, e.g., 0.0005 inch, and with a much smaller tolerance than was established by the prior art method. This precision was obtained on a workpiece five feet long, with not merely two but three transverse apertures 19 machined. It is important to have these two annular surfaces 21 and 22 parallel within a very small tolerance, so that when valve seats are mounted against these annular surfaces, the two valve seats will be precisely positioned, and then when a gate valve is moved to and fro along the direction perpendicular to the axis 23, it will establish fluidtight sealing engagement with both valve seats.

When only a single mandrel 12 is utilized to journal the tooling bar 14, then it may be desired to have a relatively long, cylindrical portion on the collet 54 for engagement with the clamping aperture 15. This will assure positive clamping and location of the tooling bar so that the annular surface 21 will be machined normal to the axis 23 without any chatter or vibration, which could distort such annular surface 21. The air bearing between the annular journal and bearing surfaces 65 and 66 provides not only a radial bearing of the tooling bar 14 for minimum friction rotation of the bar 14, but it also permits minimum friction axial movement of such tooling bar 14. This permits precise axial feed movement of the tooling bar by the machine tool, or the machine spindle (not shown), for precise machining of the annular surfaces 21 and 22.

It is readily apparent that the air under pressure accomplishes two things, namely, the air bearing support of the tooling bar, as well as the actuation of the expansible collet for clamping within the clamping aperture. However, it is not as readily apparent that the air under pressure actually accomplishes three things. These three things are: (a) the initial application of air under pressure centers each mandrel around the tooling bar 14 as a guide and support so that the two mandrels are coaxial relative to the bar and relative to each other within a very close tolerance less than 0.0005 inch; (b) after this centering of the mandrels, the air under pressure acts on the expansible collets to clamp the mandrels in the clamping apertures in this carefully aligned condition; and (c) the continued supply of air under pressure during machining of the workpiece provides the air bearing support and centering of the tooling bar 14 within each of the two mandrels for minimum friction radial bearing which permits minimum friction axial movement of the tooling bar 14.

The air bearing of the tooling bar is caused by air bled from the annular chamber 51. As stated above, the use of the air bearing during machining by the cutter assembly 71 is an air bearing support and centering of the tooling bar 14 within the mandrels 12 and 13. However, during initial clamping of the mandrels, the situation is reversed. During this initial clamping, the application of the air under pressure first centers each mandrel around the tooling bar 14 as the guide and aligning means, and then once the mandrels are centered, the collets 54 are expanded to clamp such mandrels within the clamping apertures, but only after they have been precisely centered around the tooling bar 14.

It will be noted that the annular bearing surface 66 on the mandrel 12 is on the bearing sleeve 50. Also, this annular bearing surface is cylindrical, as is the journal surface 65. The force transfer means 55 is a means to transform the axial force of the piston 52 into a radially directed force, and due to the conical angles of the cam surfaces 56, this is a force multiplication means.

FIGS. 6 and 7 show a modification of the invention in a mandrel assembly 91. This mandrel assembly includes a first mandrel 92, and just as in FIG. 2 there may be a second mandrel on the right end of the tooling bar 94. However, in order to make the scale of the drawing of FIG. 6 larger, this second mandrel is not shown. Again, the first and second mandrels would cooperate with the first and second clamping apertures 15 and 16 of the workpiece 17 (not shown in FIG. 6 but shown in FIG. 2). This tooling bar 94 also carries a cutter assembly 95 which generally may be quite similar and which performs the same function as the cutter assembly 71.

The first and second mandrels are again constructed substantially alike, except that the second mandrel can be either reversed or not reversed in position relative to the first mandrel 92. The two mandrels have an air supply means 97 which is different from the air supply means 60-63 of the embodiment of FIGS. 2 through 5. This air supply means 97 includes an annular reservoir 99 in the bearing sleeve 50. This air supply means includes internal conduits 101 and 102 longitudinally within the tooling bar 94. Two cross apertures 103 and 104 intersect the internal conduits 101 and 102, respectively, and these cross apertures are slightly misaligned in a longitudinal direction in order to supply air to the annular reservoir 99 despite slight longitudinal feed movements of the tooling bar 94. There is an air bleed conduit 106 from the reservoir 99 to the annular cylinder 51 in order to actuate the expandable collet 54.

The internal conduits 101 and 102, at the left end of FIG. 6, are supplied with air under pressure from an air chamber 107 and a cross aperture 108 which cooperates with an annular distributor groove 109 in a distributor housing 110. The distributor housing 110 is designed to be non-rotative during rotation of the tooling bar 94. The housing 110 has bearings 111 to journal the driver 44 which is secured by a setscrew 112 to the tooling bar 94. The annular distributor groove 109 is connected by a conduit 113 within the housing 110 to an external nipple 114 which makes air pressure sealing engagement with an air supply outlet 115 which is fixed relative to the machine tool 116. When the driver 44 is inserted in the machine tool spindle 117, the nipple 114 is inserted in the air supply outlet and retracts slightly within the distributor housing 110 so that a radial pin 118 is retracted away from a slot 119 in a collar 120. In this retracted position, the housing 110 may be stationary and the tooling bar 94 and driver 44 may rotate. When the driver 44 is removed from the machine tool spindle 117, a spring (not shown) urges the nipple 114 outwardly of the housing 110 so that the radial pin 118 enters the slot 119 and the collar 120, and this prevents relative rotation between the housing 110 and driver 44 so that a tool change mechanism may again reinsert the driver 44 into the machine tool spindle and still have the nipple 114 in the proper rotational position to engage the air supply outlet 115.

FIG. 7 is a view with the cutter assembly 95 removed, and illustrates how the internal conduits 101 and 102 traverse the cutter assembly 95 in order to supply air under pressure to the second mandrel (not shown). Angled apertures 123 interconnect with the internal conduits 101 and 102, and provide air communication around the transverse aperture 73 in the enlarged portion 74A, so as not to interfere with the cutter assembly 95.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A mandrel assembly for clamping on the inner surface of a clamping aperture to journal a rotatable tooling bar comprising, in combination:
   an elongated rotatable tooling bar of a diameter smaller than the clamping aperture and adapted to have a cutting tool rotatable therewith;
   a mandrel in said mandrel assembly and having a body;
   an air pressure expansible chamber in said mandrel body;
   an expanding collet carried on said mandrel body;
   force transfer means connected between said expansible chamber and said collet;
   an annular journal surface rotatable with said tooling bar;
   an annular bearing surface on said mandrel body in close proximity to said annular journal surface, and
   means connected to said mandrel body adapted to supply air under pressure to the annular space between said annular journal and bearing surfaces to establish an air bearing of said tooling bar in said mandrel body, and to supply air into said expansible chamber to expand said expanding collet against the inner surface of the clamping aperture to clamp the mandrel within the clamping aperture.

2. A mandrel assembly as set forth in claim 1, including a second mandrel adapted to be clamped in an axially spaced second aperture to journal a second axially aligned journal surface rotatable with said tooling bar.

3. A mandrel assembly as set forth in claim 1, including a universal joint at one end of said tooling bar; and
   means to rotate said tooling bar through said universal joint.

4. A mandrel assembly as set forth in claim 1, including an inner sleeve in said mandrel body, with said annular bearing surface being on said inner sleeve.

5. A mandrel assembly as set forth in claim 4, wherein said annular bearing surface is a cylindrical surface.

6. A mandrel assembly as set forth in claim 1, wherein said air pressure expansible chamber includes a relatively axially movable piston and cylinder means.

7. A mandrel assembly as set forth in claim 1, wherein said force transfer means includes cam means.

8. A mandrel assembly as set forth in claim 7, wherein expansion of said chamber causes axial movement of said cam means, said axially moving cam means causing radial movement of said expansible collet.

9. A mandrel assembly as set forth in claim 1, including an enlarged portion on said tooling bar;
   a transverse aperture through said enlarged portion; and
   a cutter assembly receivable in said transverse aperture and having a radial dimension larger than the clamping aperture to machine a surface on a workpiece.

10. A mandrel assembly as set forth in claim 1, wherein said air supply means is external to said tooling bar.

11. A mandrel assembly as set forth in claim 1, wherein said air supply means includes an internal aperture in said tooling bar.

12. A mandrel assembly for clamping on the inner surface of a clamping aperture to journal a rotatable tooling bar adapted to have a cutting tool rotatable therewith, the mandrel assembly including a mandrel having an expansible collet on a mandrel body with an annular journal surface rotatable with the tooling bar closely cooperable with an annular bearing surface on the mandrel body, characterized by:
   an air pressure expansible chamber in said mandrel body;
   force transfer means between said expansible chamber and said expansible collet;
   means for supplying air under pressure to the annular space between said annular journal and bearing surfaces to establish an air bearing of the tooling bar in said mandrel; and
   means for supplying air under pressure into said expansible chamber to expand the expanding collet against the inner surface of the clamping aperture to clamp the mandrel within the clamping aperture.

13. The assembly of claim 12, wherein said expansible chamber is piston means within cylinder means.

14. The assembly of claim 12, wherein said expansion of the chamber causes axial movement of said force transfer means, said axial movement of the force transfer means causing substantially radial movement of said expansible collet.

15. The assembly of claim 12, wherein said force transfer means includes force multiplying means.

16. The assembly of claim 12, wherein the air bearing is a radial bearing; and
   said means for supplying air under pressure centers the mandrel assembly around the tooling bar.

17. The assembly of claim 12, including a second mandrel adapted to be clamped in an axially spaced second clamping aperture; and
   means journaling a second axially spaced annular journal surface rotatable with the tooling bar in said second mandrel.

18. The method of clamping a mandrel assembly into a clamping aperture to journal a rotatable tooling bar adapted to have a cutting tool rotatable therewith, the mandrel assembly including a mandrel having an expansible collet on a mandrel body with an annular journal surface rotatable with the tooling bar closely cooperable with an annular bearing surface on the mandrel body, said method comprising the steps of:
   providing an air pressure expansible chamber in the mandrel body;
   providing force transfer means between the expansible chamber and the expansible collet;

supplying air under pressure to the annular space between the annular journal and bearing surfaces to establish an air bearing centering the mandrel around the tooling bar; and supplying air under pressure into said expansible chamber to expand the expanding collet against the inner surface of the clamping aperture to clamp the mandrel within the clamping aperture.

19. The method of claim 18, wherein said air bearing is supplied with air bled from said expansible chamber.

20. The method of claim 18, wherein said expansible chamber is supplied with air bled from said air bearing.

21. The method of claim 18, including a second mandrel adapted to be clamped in an axially spaced second clamping aperture; and journaling a second axially spaced annular journal surface rotatable with said tooling bar in said second mandrel.

22. The method of claim 21, including supplying air under pressure substantially simultaneously to said two mandrels to center the two mandrels around said tooling bar prior to the clamping of the two mandrels by the expansion of the respective collets.

23. The method of claim 22, including providing a convex shape to each collet of the two mandrels for self-aligned clamping of the two mandrels in the clamping apertures.

24. The method of claim 18, including continuing to supply air under pressure to the annular space between the annular journal and bearing surfaces during rotation of the tooling bar and machining with the rotatable cutting tool to establish an air bearing support and centering of the tooling bar within the mandrel.

* * * * *